United States Patent Office 3,555,124
Patented Jan. 12, 1971

3,555,124
METHOD FOR PREPARING HYDROXYALKYL-AMINO-N,N-DI (METHYLENE PHOSPHONATES)
Thomas M. Beck, Hastings-on-Hudson, N.Y., and Stanley B. Mirviss, Stamford, Conn., assignors to Stauffer Chemical Company, New York, N.Y., a corporation of Delaware
No Drawing. Continuation-in-part of application Ser. No. 676,743, Oct. 20, 1967. This application Feb. 10, 1969, Ser. No. 798,149
Int. Cl. C07f 9/40
U.S. Cl. 260—970
12 Claims

ABSTRACT OF THE DISCLOSURE

A method for preparing compounds having utility as fire retardant compounds for polyurethane foams of the formula:

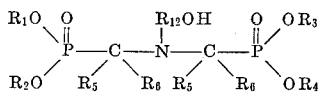

wherein $R_1$, $R_2$, $R_3$ and $R_4$ can be independently selected from the group consisting of alkyl, haloalkyl, alkoxyalkyl, hydroxyalkyl, hydroxyalkoxyalkyl or aryl radicals; and $R_5$ and $R_6$ can be independently selected from the group consisting of hydrogen, alkyl, alkoxyalkyl, hydroxyalkyl, hydroxyalkoxyalkyl or aryl and $R_{12}$ is an alkylene group of from 2 to 10 carbon atoms and substituted derivatives thereof which comprises (a) reacting a primary mono-alkanolamine of the formula

with at least two molar equivalents of a carbonyl compound of the formula

and (b) incrementally adding the reaction mixture resulting from step (a) to a phosphonic acid diester of the formula

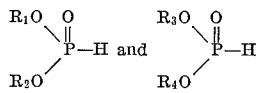

the addition being conducted after adjusting the amount of free water present in said reaction mixture to less than 0.75 mole water per mole of phosphonic acid diester reactant used.

CROSS REFERENCE TO RELATED APPLICATIONS

This application is a continuation-in-part of the copending application S.N. 676,743, filed Oct. 20, 1967 in the name of Thomas M. Beck, co-inventor of the present application.

FIELD OF THE INVENTION

The present invention relates to novel compounds of the formula:

(I) 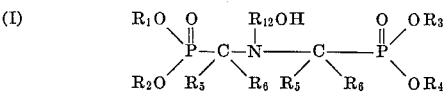

wherein $R_1$, $R_2$, $R_3$ and $R_4$ can be independently selected from the group consisting of alkyl, haloalkyl, alkoxyalkyl, hydroxyalkyl, or aryl radicals and $R_5$ and $R_6$ can be independently selected from the group consisting of hydrogen, alkyl, hydroxyalkyl, hydroxyalkoxyalkyl, or aryl and $R_{12}$ is an alkylene radical of from 2 to 10 carbon atoms or substituted derivatives thereof and to new and novel methods for preparing the same. The present invention also relates to novel compounds of the formula:

(II) 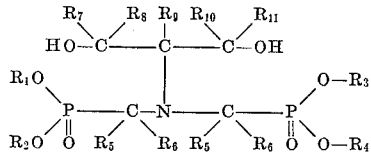

wherein $R_1$, $R_2$, $R_3$ and $R_4$ can be independently selected from the group consisting of alkyl, haloalkyl, alkoxyalkyl, hydroxyalkyl, hydroxyalkoxyalkyl or aryl radicals; and $R_5$, $R_6$, $R_7$, $R_8$, $R_9$, $R_{10}$, and $R_{11}$ can be independently selected from the group consisting of hydrogen, alkyl, alkoxyalky, hydroxyalkyl, hydroxyalkoxyalkyl, or aryl radicals and the method of preparing same. As used herein, the term alkyl is intended to include alkyl radicals substituted with such substituents as carbonyl groups, aldehyde, amido, keto, carboxylate ester aryl groups and the like, plus polyalkoxy radicals. In a similar manner, the term aryl is intended to include substituted aryl radicals or arylalkyls.

The present invention also relates to a method of preparing the compounds of the Formula II which compounds are characterized by acid numbers in isopropanol of below about 10.0 mg. KOH/gram of sample.

In the polyurethane field, increased interest is being shown in compounds which can be added to the polyurethane polymer to act as fire-retardant agents. Particular interest is being shown in compounds which have functional groups reactive with the polyol or the polyisocyanate used in preparing the polyurethane so that the fire-retardant agent can be chemically incorporated into the polyurethane. One such group of compounds of this type are the phosphorus containing fire-retardant agents, such as the hydroxyalkylaminoalkylphosphonates and their method of preparation as set forth in the U.S. patent to Beck et al., 3,076,010 issued Jan. 29, 1963. Within this group of phosphorus containing fire-retardant agents, it is known that the amount of phosphorus in the compound has some correlation to the effectiveness of the compound as a fire-retardant agent. It is known that a more effective fire-retardant agent can be obtained by increasing the phosphorus content of the compound without effecting a large increase in the molecular weight thereof. However, prior art method such as disclosed in Petrov et al., J. Gen. Chem. U.S.S.R. 29, 587 (1959) have not proven to be effective in preparing reactive phosphorus containing fire-retardant compounds.

It is also known that phosphonate fire-retardant agents of the type disclosed in Beck et al. when in substantially pure form can be easily incorporated into the polyurethane polymerization system. However, some of the commercial methods of preparing this type of compound provide a final product which is high in acid content, and this acid content can be extremely detrimental to certain catalyst systems used in the formation of polyurethan polymers. These certain catalysts are amine compounds which are basic and which are neutralized by acid thereby destroying their catalytic activity. Because of the expense of these amine compounds, any such destruction of catalytic activity by another additive in the reaction mixture used to form the polyurethane polymer is economically undesirable.

It has now been found that new compounds providing an increased phosphorus content without substantially increasing the molecular weight can be provided. It has also been found that these compounds can be easily prepared in substantially quantitative yields with acid levels sufficiently low so as not to interefer with the catalytic activity of the amine catalyst systems used in the formation of polyurethane polymers.

The new compounds of this invention can be represented by the formulas:

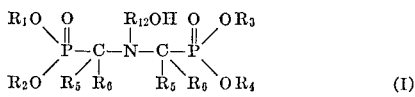

(I)

and

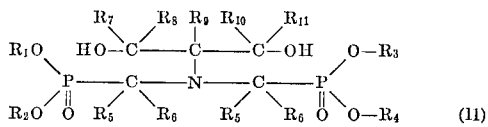

(II)

wherein the R substituents are the same as given hereinbefore. Preferably, $R_5$ is hydrogen, and most preferably, $R_5$, $R_6$, $R_7$, $R_8$, $R_{10}$ and $R_{11}$ are hydrogen, and in Formula I, $R_{12}$ is preferably $—C_2H_4—$, and, in Formula II, $R_9$ is preferably hydrogen or alkyl.

The compounds of Formula I are prepared in high purity by a new method which comprises reacting one mole of a primary alkanole amine of the formula:

(III)   $H_2NR_{12}OH$ wherein $R_{12}$ is as defined hereinbefore, with at least two molar equivalents of a carbonyl compound of the formula:

(IV)

The above reaction product is then reacted with at least one mole of each of the phosphonic acid diesters (phosphonates) of the formulas:

(V)

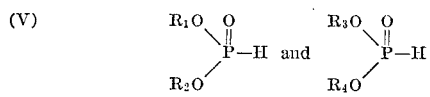

the addition being conducted after adjusting the amount of free-water present in the intermediate to less than 0.75 mole water per mole of phosphonate reactant used. By using the above process, compounds of at least 90% purity can be obtained. It is preferred that the carbonyl compound be paraformaldehyde so as to insure low water content of the reaction intermediate. It is also essential that the intermediate be incrementally added to the phosphonate reactant in order to obtain the desired product in high yield.

The new compounds of Formula II can be made by reacting a 1-aza-3, 7-dioxa-bicyclo (3:3:0) octane derivative of the formula:

(VI)

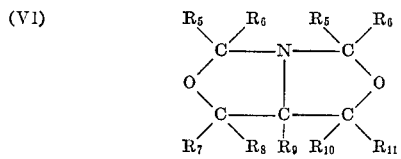

with phosphonic acid diesters of the formulas:

(V)

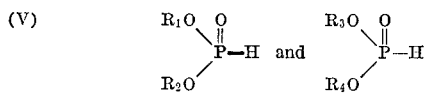

the R substituents of the reactants being the same as given above for the prepared compound.

Preferably, the above reactions are conducted while maintaining the amount of available free-water present during the reaction to less than 0.75 mole water per mole of phosphonate reactant used. By maintaining the water content at this low level, the reaction yields a product of very low acid content, which content is sufficiently low so as not to interfere with the catalytic activity of the amine catalyst systems used in the formulation of polyurethane polymers.

As used herein, the term phosphonate is intended to covers esters of a pentavalent phosphorus acid of the structure:

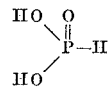

The term phosphonic acid as used herein is intended to include acids of phosphorus which are trivalent in the pure acid form but pentavalent when esterified, e.g., phosphorous acid. Further, the term phosphonate in reference to the diesters is intended to be synonymous with the term diester phosphites as used in the prior art to describe the compounds of Formula V.

The 1-aza-3, 7-dioxa-bicyclo (3:3:0) octanes of Formula IV are known compounds and can be easily prepared by known methods. Illustrative of these methods is the reaction of an aldehyde or ketone with a 2-amino 1,3-propanediole. The chemistry of this reaction proceeds according to the following equation:

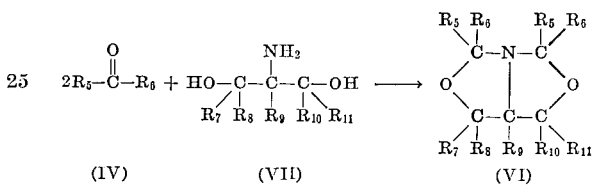

(IV)        (VII)        (VI)

The reaction of the carbonyl compound and the primary amine (Formula III or VII) can be conducted in bulk or in an inert solvent, such as heptane, tetraline, benzene, xylene or toluene, and preferably those inert solvents adapted to form an azeotrope with the water of reaction. The reaction can also be conducted using aqueous solutions of reactants, such as formaline, followed by removal of the product from the aqueous medium. The bulk reaction is more convenient and paraformaldehyde can be advantageously used as the source of formaldehyde in a bulk reaction. Paraformaldehyde is particularly advantageous in preparing the compounds of Formula I since no water removal step is required.

The reaction between the carbonyl compound and the 2-amino-1,3-propanediol requires the use of a molar ratio of at least 2:1 in order to prepare the desired 1-aza-3,7-dioxa-bicyclo (3:3:0) octane. Similarly, the reaction between the carbonyl compound and the primary alkanol amine also requires the use of a molar ratio of at least 2:1 in order to form the desired intermediate product used in forming the product as defined in Formula I. Preferably, the molar ratio in both cases is maintained above 2:1 in order to obtain a quantitative yield of product.

The various methods of preparing 1-aza-3,7-dioxa-bicyclo (3:3:0) octane derivatives and precursors for the preparation thereof are adequately set forth in an article by E. D. Bergman entitled "The Oxazolidines", Chemical Reviews, 53 page 309 et seq. (1953), the material of which is hereby incorporated by reference.

Illustrative of the aldehydes or ketones (carbonyl compounds) which can be used in the present invention are:

Aldehydes.—Formaldehyde, paraformaldehyde, acetaldehyde, propionaldehyde, butyraldehyde, isobutyraldehyde, benzaldehyde, cyclohexylcarboxyaldehyde, furfural, isovaleraldehyde, diethylacetaldehyde, heptaldehyde, 2-ethylhexanal, succinaldehyde, glyoxal;

Ketones.—Acetone, methyl ethyl ketone, methyl propyl ketone, methyl isobutyl ketone, methyl isopropyl ketone, diethyl ketone, dipropyl ketone, diisobutyl ketone, acetophenone, acetylacetone, 3-hydroxymethylenecamphor, 3-methyl - 3 - butanol - 2 - one, cyclopentanone, cyclopropyl methyl ketone, pinacolone, mesityl oxide, acetonylacetone, ethyl acetoacetate, cyclohexanone, amyl methyl ketone, cycloheptanone, 2-methylcyclohexanone, 3-methylcyclohexanone, 4-methylcyclohexanone, dihydroisophorone, diisoamyl ketone, and the like.

The terms aldehyde and ketone are intended to include compounds which form aldehydes or ketones under the conditions of reaction, such as paraformaldehyde which is a preferred reactant. Other compounds such as acetals and ketals, illustrated by dibutyl diethyl ketal can also be used. The foregoing are given as illustrative and are in no way intended to be inclusive of all carbonyl compounds which are usable in the present invention.

Illustrative of the primary alkanol amines which can be used in the method of the present invention for preparing compounds of Formula I are:

- $C_2$ ------ Ethanolamine.
- $C_3$ ------ 1-amino-2-propanol.
  - 2-amino-1-propanol.
  - 1-amino-2,3-propanediol.
  - (2-amino-1,3-propanediol).
  - 1-amino-3-chloro-2-hydroxypropane.
  - Isopropanol amine.
- $C_4$ ------ 2-amino-2-methyl-1-propanol.
  - 2-amino-1-butanol.
  - (2-amino-2-methyl-1,3-propanediol).
  - Aminotrimethylolmethane.
- $C_5$ ------ 1-amino-3-methyl-2-butanol.
  - (2-amino-3-ethyl-1,3-propanediol).
  - 2-amino-3-methyl-3-butanol.
- $C_6$ ------ (2-amino-3-propyl-1,3-propanediol).
  - 2-amino-3-isopropyl-1,3-propanediol).
  - 2-aminocyclohexanol (cis and trans).
  - 2-amino-3-methyl-3-pentanol.
  - 3-amino-4-hexanol.
  - 2-amino-4-ethoxy-1-butanol.
- $C_7$ ------ 2-amino-2-methyl-3-hexanol.
  - γ-(2-hydroxyisobutylamino)propylamine.
- $C_8$ ------ 2-amino-3,5-dimethyl-3-hexanol.
  - 1 (α-Amineoethyl)cyclohexanol.
  - 4-amino-5-octanol.
- $C_9$ ------ 2-amino-1-indanol.
  - 1-amino-2-indanol.
  - Norephedrine (2-amino-1-phenyl-1-propanol).
  - Pseudonorephedrine (2-amino-1-phenyl-1 propanol.
  - 3,4-dihydroxynorephedrine.
  - 3-hydroxynorephedrine.
  - 4-hydroxynorephedrine.
  - 3-aminonorephedrine.
    - (2-amino-1-p-nitrophenyl-1,3-propanediol) (threo).
- $C_{10}$ ----- Ephedrine.
  - Pseudoephedrine.
  - 2-amino-5-methoxy-1-indanol.
  - 2-amino-6-methoxy-1-indanol.
  - 2-amino-7-methoxy-1-indanol.
  - 3-amino-3,4-diethyl,4-hexanol.
- $C_{11}$ ----- Ethyl p-nitrophenylserinate (erythro and threo).
  - 2-amino-5,6-dimethoxy-1-indanol.
  - 2-amino-4,5-dimethoxy-1-indanol.
- $C_{20}$ ----- Δ5-3β,17β-dihydroxy-17α-aminomethyl-androstene.

and the like. These compounds are given as illustrative of the numerous primary alkanol amine compounds which can be used in the method of the present invention and are in no way intended to be entirely inclusive of all such compounds.

Illustrative of the 2-amino-1,3-propanediols which can be used to form the compounds of Formula II of the present invention are:

2-amino-1,3-propanediol
2-amino 2-methyl-1,3-propanediol
Aminotrimethylolmethane
2-amino-1,3-diethyl-1,3-propanediol
2-amino-3-propyl-1,3-propanediol
2-amino-3-isopropyl-1,3-propanediol
2-amino-1-p-chlorophenyl-1,3-propanediol and the like. The term 2-amino-1,3-propanediol is intended to include all compounds which have a primary amine substituent attached to a carbon chain which has hydroxy functionality on each of the carbon atoms adjacent to the carbon atom to which the monoamine group is attached. The above compounds are given as illustrative of the numerous monoamino compounds which fall within this description and are in no way intended to be entirely inclusive of all such compounds.

Illustrative examples of the 1-aza-3,7-dioxa-bicyclo (3:3:0) octanes which can be used in the present invention are:

2,8-diethyl derivative
4,5-dimethyl-2-propyl derivative
4,5-diethyl-2,6,8 trimethyl derivative
4,5-dimethyl derivative
4,5,6-trimethyl derivative
4,5-diphenyl derivative
5-methyl derivative
5-ethyl derivative.

These are given as illustrative and are in no way intended to be inclusive of all the 1-aza-3,7-dioxa-bicyclo (3:3:0) octanes which can be used in the method of the present invention.

The diesters of phosphonic acid, e.g., diester phosphonates for use in the method of the present invention are compounds of the formulas:

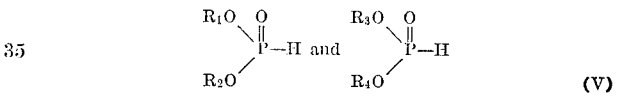

(V)

wherein $R_1$ and $R_3$ can be alkyl, arylalkyl, haloalkyl, hydroxyalkyl or aryl and $R_2$ and $R_4$ can be alkyl, haloalkyl, hydroxyalkyl or aryl independent of $R_1$ and $R_3$. Illustrative of the alkyl groups are methyl, ethyl, propyl, butyl and the like. Alkyl is also intended to include substituted alkyl groups including aromatic substituted alkyls such as benzyl, alkoxyalkyl groups such as methoxyethyl and ethoxyethyl, and the polymeric forms thereof corresponding to the formula $R_xO(R_yO)_n$— wherein $R_x$ and $R_y$ are alkyl, aryl and ethylenically unsaturated groups such as allyl, and the like and $n$ is an integer. The haloalkyl group can be illustrated by chloroethyl, bromoethyl and the like. Examples of the hydroxyalkyl groups are hydroxyethyl, hydroxypropyl and the like. Hydroxyalkyl is intended to include hydroxyalkoxyalkyl groups, such as hydroxyethoxyethyl, and polymeric forms thereof corresponding to the formula $HOR_xO(R_yO)_n$— wherein $R_x$, $R_y$ and $n$ are the same as above. The aryl group can be illustrated by phenyl, naphthyl, xylyl and cresyl and derivatives thereof. These aforegoing examples are given as illustrative of the numerous substituents which are intended to be included within the scope of the definition of the phosphonate reactant.

Representative examples of the diesters of phosphonic acid, e.g., diester phosphonates which are useable in the process of the present invention are: dimethyl phosphonate, diethyl phosphonate, diisopropyl phosphonate, dibutyl phosphonate, dihexyl phosphonate, dioctyl phosphonate, bis(2-hydroxyethyl)phosphonate, dihydroxypropyl phosphonate, dichloroethyl phosphonate, dibromoethyl phosphonate, dimethoxyethyl phosphonate, diallyl phosphonate, dibenzyl phosphonate, diphenyl phosphonate, and the like; ethyl methyl phosphonate, ethyl chloromethyl phosphonate, methyl benzyl phosphonate and the like. These materials are given as illustrative and are in no way inclusive of all the possible diesters of phosphonic acid which are useable to form the desired diphosphonates in accordance with the present invention.

It is preferred that the aforementioned diesters of phosphonic acid be substantially pure. Commercially obtainable materials, while operable in the invention, contain some impurities which can increase the acid content of the final product to a slight degree. As the desired goal is diphosphonate with as low an acid numer as possible, the elimination of any impurities which contribute in a small way to the acid content can allow for the preparation of a final product having a lower acid number.

The reaction between the carbonyl-primary alkanol amine reaction product or the 1-aza-3,7-dioxa-bicyclo (3:3:0) octane and the diester of phosphonic acid is preferably conducted under substantially anhydrous conditions. While a small quantity of free available moisture of up to 0.75 mole water per mole of phosphonate used as reactant can be tolerated, it is undesirable in that increasing amounts of moisture contribute to increased acid values in the final product. Therefore, it is preferred to conduct the reaction with the prosphonate in the presence of less than about 0.25 mole water per mole of phosphonate reactant, and most preferably in the total absence of free available moisture, e.g., use of completely anhydrous reaction conditions. By the term free available moisture or water is meant water which is not physically or chemically bound to such an extent so as to be unavailable for chemical reaction. Thus, and to effect this preferred end, the reactants are preferably completely anhydrous prior to reaction. This can be accomplished by any known means of removing moisture from a chemical compound.

In the preparation of the monoalkanol amine derivatives as set forth in Formula I, it has been found practical to utilize paraformaldehyde as a preferred reactant in that water formation is limited during the preparation of the amine-carbonyl intermediate. The reaction of two moles of the anhydrous formaldehyde with one mole of a primary amine produces, in theory, at most about one mole of water. In addition to the small amount of water normally present in paraformaldehyde, i.e., less than 10%, the intermediate reaction mixture made from paraformaldehyde thus contains a maximum of about 1.1 mole water, which is less than the maximum requirement of 0.75 mole water/mole phosphonate as about two moles of phosphonate are generally used for each mole of intermediate (maximum 1.50 mole/2 moles phosphonate). The use of the paraformaldehyde thus allows for a continuous process which may not require the physical removal of any water from the intermediate reaction mixture. Good yields and acid numbers are obtained in this manner. Further improvement in the acid number can be obtained by reducing further the amount of water present in the reaction mixtures.

In preparing the compounds of Formula I, it is essential that the intermediate carbonyl-amine reaction product be incrementally added to the phosphonate reactant in order to obtain the desired product in high yield. In conducting this addition, it is preferred that the phosphonate reactant be heated to reaction temperature prior to the addition. The preferred reaction temperatures are from about 50° C. to about 100° C.

1 - aza - 3,7 - dioxa - bicyclo (3:3:0) octanes have a known tendency to absorb moisture from the atmosphere. Therefore, 1 - aza - 3,7 - dioxa - bicyclo (3:3:0) octanes should be dried and used as soon as possible after drying or stored under substantially anhydrous conditions.

The compounds of the present invention can be prepared in a batch or continuous type reaction. Any equipment which can maintain the substantially anhydrous conditions required for the preferred reaction can be used. The equipment need only have the usual temperature control devices such as heating and cooling coils. The equipment is not critical and adaptation of existing equipment to allow performance of the method of the present invention is within the purview of the skilled artisan.

If it is desired to obtain different substituents on the phosphonate portions of the finally obtained product, partial reaction of the reaction product of the alkanolamine/carboxyl compound on the 1-aza-3,7-dioxa-bicyclo (3:3:0) octane compound can be conducted using less than two moles of a phosphonate and preferably approximately an equimolar amount of a specific phosphonate followed by reaction of the compound thus prepared with another phosphonate, preferably in about an equimolar amount. The foregoing concept can also be utilized to prepare mixed phosphonates by using as the initial reactant a mixture of diester phosphonates.

The compounds of the present invention can also be prepared by a continuous process which includes the reaction of a carbonyl compound with a primary alkanolamine or a 2-amino-1,3 propanediol in the required proportions followed by reacting the resulting material with a diester phosphonate, preferably in the presence of less than 0.75 mole water per mole of phosphonate reactant used. The water of reaction which is formed in the reaction of the carbonyl compound and the primary alkanol amine or the 2-amino-1,3 propanediol can be easily removed by distilling the reaction product using an azeotropic solvent such as benzene, xylene or toluene. Water of solution can also be removed in this manner. Other means of isolating the free water such as by the use of desiccating agents such as anhydrous calcium sulfate, and the like can also be used. The essential step of this reaction is that substantially all water of reaction or solution be removed from the reaction mixture or chemically or physically isolated into a non-reactive state prior to the addition of the diester of phosphonic acid to the reaction mixture. Any known means of effecting this end can be used. It is preferred to strip all water from the system using an azeotropic solvent distillation system followed by removal of the azeotropic solvent. However, any solvent or other impurity, such as a desiccating agent, which does not affect the overall reaction can remain in the reaction mixture.

The rate of reaction between the 1-aza-3,7-dioxa-bicyclo (3:3:0) octane and the phosphonic acid diester is temperature dependent in that the reaction proceeds at a greater rate as the temperature increases. Temperatures substantially above 110° C. should be avoided as they tend to degrade the 1-aza reactant.

The rate of reaction between the carbonyl compound and the 2-amino-1,3 propanediol is fairly rapid and excessive reaction conditions are not necessary to induce the reaction. Temperatures substantially above 110° C. should be avoided as they tend to degrade the reaction product. Preferably, temperatures within the range of about 25° C. to about 100° C. are used especially when using paraformaldehyde as the carbonyl compound.

In utilizing complex ketones and/or complex 2-amino-1,3 propanediols, it may be desirable to include a slight trace of catalytic material in the reaction mixture to increase the rate of reaction. Illustrative of catalytic materials which can be used are iodine, hydrochloric acid, acetic acid, and potassium cyanide. Preferably, the use of such catalytic materials is avoided as they introduce added impurities in the reaction system and, in the case of the acid catalysts, can add slightly to the acid number.

Representative examples of the diphosphonates of Formula I included within the scope of the present invention are:

(1) N,N-bis(dimethylphosphonomethyl)2-hydroxyethylamine
(2) N,N-bis(diethylphosphonomethyl)2-hydroxyethylamine
(3) N,N-bis(dipropylphosphonomethyl)3-hydroxypropylamine
(4) N,N-bis(dibutylphosphonomethyl)4-hydroxybutylamine (5) N-(dibutyl-1-phosphonoethyl-1),N-diethyl-1-phosphonoethyl-1) hydroxyethylamine
(6) N-(dihexyl-2-phosphonopropyl-2),N-(dioctyl-2-phosphonopropyl-2),2-hydroxyethyl amine
(7) N-(methyl ethyl phosphonomethyl),N-propyl butyl phosphonomethyl)2-hydroxyethyl amine
(8) N,N-bis(dichloroethylphosphonomethyl)2-hydroxy ethylamine
(9) N,N-bis(dihydroxymethylphosphonomethyl)5-hydroxy, 3-oxo-pentylamine
(10) N,N-bis(diethoxyethylphosphononomethyl) 4-hydroxy, 8-phenyl-octylamine
(11) N,N-bis(dihydroxyethoxyethylphosphonomethyl) 2-hydroxy, 6-diethylaminohexylamine
(12) N,N-bis(diphenylphosphonomethyl) 10-hydroxy decylamine Representative examples of diphosphonates of Formula II included within the scope of the present invention are:

(1) 2-bis(dimethyl phosphonomethyl)amino 1,3-dihydroxy propane
(2) 2-bis(diethyl phosphonomethyl)amino 2-methyl 1,3-dihydroxy propane
(3) 2-bis(diethyl phosphonomethyl)amino 2-ethyl 1,3-dihydroxy propane
(4) bis(dipropyl 1-phosphonopropyl) dimethylolmethyl amine
(5) (ethyl methyl 1-phosphonobutyl) (ethyl methyl phosphonomethyl) 1-methyl, 1-methylol, 2-hydroxypropyl amine
(6) 3-bis(diethyl 1-phosphonoethyl)amino 2,4-dihydroxy, 3-ethyl hexane
(7) 2-bis(dibenzyl phosphonomethyl)amino 1,3-dihydroxy, 2-methyl butane
(8) 2-bis(di-tert-butyl phosphonomethyl)amino 1,3-dihydroxy, 2,3-diphenyl propane
(9) 3-bis(didodecyl phosphonomethyl)amino 2,4-dihydroxy, 3-methyl pentane
(10) (diethyl phosphonomethyl) (dimethyl phosphonomethyl) dimethylolmethyl amine
(11) 2-bis(diphenyl phosphonomethyl)amino 1,3-dihydroxy propane These are given as illustrative and are in no way intended to be inclusive of all the diphosphonates which are included within the scope of the present invention.

The compounds of the present invention can be used as effective flame retardant compounds for polyurethane polymers. Due to the presence of reactant hydroxy functionality, the compounds can be copolymerized with polyisocyanates so as to chemically incorporate the compounds into the polymer chain. The compounds of the present invention can also be used as surfactants.

The invention is illustrated in the examples which follow:

EXAMPLE 1

Preparation of 5-methyl-1-aza-3,7-dioxa-bicyclo (3:3:0) octane

In a one liter flask equipped with stirrer, thermometer, reflux condenser and Barrett trap are placed 105 grams (1 mole) of 2-amino-2-methyl-1,3-propanediol, 66.6 grams of paraformaldehyde (2.08 moles) and 300 milliliters of benzene. Sufficient additional benzene is added to fill the Barrett trap. The reaction mixture is stirred and heated to reflux until no more water collects in the trap. The product is recovered after stripping off the benzene in a 12 inch Vigreux.

Preparation of 2-bis(diethyl phosphonomethyl)amino 2-methyl 1,3 dihydroxy propane 64.5 grams (0.5 mole) of anhydrous 5-methyl-1-aza-3, 7-dioxa-bicyclo (3:3:0) octane are placed in a stoppered reaction vessel equipped with a stirrer, dropping funnel and heating mantle and the contents are heated to 60° C. with stirring. 138 grams (1 mole) of diethyl phosphonate is placed in the dropping funnel and incrementally added to the heated 5-methyl-1-aza-3,7-dioxa-bicyclo (3:3:0) octane at such a rate that the temperature is maintained below about 70° C. The reaction is slightly exothermic and moderate external cold water cooling is used to maintain the reaction temperature at about 70° C. When the addition of the diethyl phosphonate is complete, the reaction mixture is stirred at 70° C. for an additional 90 minutes. The product, 2-bis(diethyl phosphonomethyl) amino 2-methyl 1,3-dihydroxy propane, is then recovered.

EXAMPLES 2–11

The following compounds are prepared by reacting the listed reactants using the reaction procedure of Example 1:

Example 2.—2-bis(dimethyl phosphonomethyl)amino 1,3-dihydroxy propane using 1-aza-3,7-dioxa-bicyclo (3:3:0) octane and dimethyl phosphonate;

Example 3.—2-bis(diethyl phosphonomethyl)amino 2-ethyl 1,3-dihydroxy propane using 5 - ethyl-1-aza-3,7-dioxa-bicyclo (3:3:0) octane and diethyl phosphonate;

Example 4.—bis(dipropyl 1-phosphonopropyl)dimethylolmethyl amine using 2,8-diethyl-1-aza-3,7-dioxa-bicyclo (3:3:0) octane and dipropyl phosphonate;

Example 5.—(ethyl methyl 1-phosphonobutyl) (ethyl methyl phosphonomethyl) 1-methyl, 1-methylol, 2-hydroxypropyl amine using 2-propyl-4,5-dimethl-1-aza-3,7-dioxa-bicyclo (3:3:0) octane and methyl ethyl phosphonate;

Example 6.—3-bis(diethyl 1-phosphonoethyl)amino 1,3-dihydroxy, 2-ethyl hexane using 2,6,8-trimethyl-4,5-diethyl-1-aza-3,7-dioxa-bicyclo (3:3:0) octane and diethyl phosphonate;

Example 7.—2-bis(dibenzyl phosphonomethyl)amino 1,3-dihydroxy, 2-methyl butane using 4,5-dimethyl-1-aza-3,7-dioxa-bicyclo (3:3:0) octane and dibenzyl phosphonate;

Example 8.—2-bis(di-tert. butyl phosphonomethyl) amino 1,3-dihydroxy, 2,3-diphenyl propane using 4,5- diphenyl-1-aza-3,7-dioxa-bicyclo (3:3:0) octane and di-tert. butyl phosphonate;

Example 9.—3-bis(didodecyl phosphonomethyl)amino 2,4-dihydroxy, 3-methyl pentane using 4,5,6-trimethyl-1-aza-3,7-dioxa-bicyclo (3:3:0) octane and didodecyl phosphonate;

Example 10.—(diethyl phosphonomethyl) (dimethyl phosphonomethyl) dimethylolmethyl amine using 1-aza-3,7-dioxa-bicyclo (3:3:0) octane, dimethyl phosphonate and diethyl phosphonate;

Example 11.—2-bis(diphenyl phosphonomethyl)amino 1,3-dihydroxy propane using 1-aza-3,7-dioxa-bicyclo (3:3:0) octane and diphenyl phosphonate.

EXAMPLE 12

Preparation of N,N-bis(diethyl phosphonomethyl)2-hydroxyethyl amine

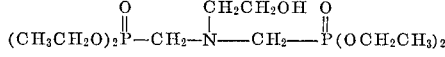

In a one liter flask equipped with a stirrer thermometer and heating mantle was placed 91.5 grams (1.5 moles) of ethanolamine. The stirrer was started and 48 grams (≈1.5 moles) of paraformaldehyde was added. The admixture was heated to 50° C. whereupon a vigorous exothermic reaction took place which was checked with an ice bath. After stabilizing the temperature of the reaction mixture at 50° C., an additional 48 grams (≈1.5 moles) of paraformaldehyde was added to the reaction mixture. The reaction mixture was stirred at 60° C. for an additional two hours to provide a clear light solution into which substantially all of the paraformaldehyde had dissolved. The final product weighed 186 grams as against 187.5 for the initial starting materials indicating a yield of approximately 1.488 moles. This reaction product was added in a 5% excess to diethyl phosphonate by placing 391.1 grams (2.834 moles) of diethyl phosphonate in a one liter flask equipped with a stirrer, thermometer, dropping funnel and heating mantle and heating the diethyl phosphonate to 60° C. The amine-carbonyl reaction product was placed in the dropping funnel and added to the heated diethyl phosphonate at a rate of about 5 milliliters per minute. After the addition was completed, the reaction mixture was stirred at 70° C. to 74° C. for about two hours. The product was a clear amber liquid which was then stripped of all volatiles first at 10 millimeters of mercury and 70° C. and then at 2 millimeters of mercury and 70° C. The product weighed 511 grams (97.5% yield) and had an acid number in isopropanol of 12.7. Structural assignment was confirmed by infrared spectroscopy and nuclear magnetic resonance analytical techniques.

EXAMPLES 13–23

The following compounds are prepared by reacting the listed reactants using the reaction procedure of Example 12:

Example 13.—N,N - bis(dimethylphosphonomethyl)-2 - hydroxyethylamine using paraformaldehyde, 2-hydroxyethylamine and dimethylphsphonate;

Example 14.—N,N - bis(dipropylphosphonomethyl)3-hydroxypropylamine using paraformaldehyde, 3-hydroxypropylamine and dipropylphosphonate;

Example 15.—N,N - bis(dibutylphosphonomethyl)4-hydroxybutylamine using paraformaldehyde, 4-hydroxybutyl amine and dibutylphosphonate;

Example 16.—N-(dibutyl - 1 - phosphonoethyl - 1, N-(diethyl-1-phosphonoethyl-1), 2 - hydroxyethylamine using acetaldehyde, 2-hydroxyethylamine, dibutyl phosphonate and diethylphosphonate;

Example 17.—N-(dihexyl - 2-phosphonopropyl-2, N-(dioctyl-2 - phosphonopropyl-2), 2 - hydroxyethylamine using acetone, 2-hydroxyethylamine, dihexylphosphonate and dioctylphosphonate;

Example 18.—N-(methyl ethyl phosphonomethyl), N-(propyl butyl phosphonomethyl)2 - hydroxyethyl amine using formaldehyde, 2-hydroxyethylamine, methyl ethyl phosphonate and propyl butyl phosphonate;

Example 19.—N,N - bis(dichloroethyl phosphonomethyl) 2-hydroxyethylamine using paraformaldehyde, 2-hydroxyethylamine, and dichloroethylphosphonate;

Example 20.—N,N - bis(dihydroxymethylphosphonomethyl) 5-hydroxy, 3 oxopentylamine, using paraformaldehyde, 5-hydroxy, 3 oxopentylamine and dihydroxymethylphosphonate.

Example 21.—N,N - bis(diethoxyethylphosphonomethyl) 4-hydroxy, 8-phenyloctylamine using paraformaldehyde, 4-hydroxy, 8-phenyloctylamine, and diethoxyethyl phosphonate.

Example 22.—N,N - bis(dihydroxyethoxyethyl phosphonomethyl) 2-hydroxy, 6-diethylamino hexylamine using paraformaldehyde, 2-hydroxy, 6-diethylamino hexylamine and dihydroxyethoxyethyl-phosphonate.

Example 23.—N,N-bis(diphenylphosphonomethyl) 10-hydroxydecylamine using formaldehyde, 10-hydroxydecyl amine and diphenyl phosphonate.

The foregoing examples are given as illustrative of compounds falling within the scope of Formulas I and II. Numerous other compounds falling within the scope of Formula I and II can be similarly prepared using the aforedescribed methods by the use of various other carbonyl compounds falling within the scope of Formula IV, by the use of various other primary alkanol amines falling within the scope of Formula III and 2-amino-1,3-propanediols falling within the scope of Formula VII, and by the use of various other phosphonates falling within the scope of Formula V. By the use of the preferred method set forth herein, compounds can be prepared which are characterized as having acid numbers in isopropanol of below 10 mg. KOH/gram of sample.

Thus, and in accordance with the present invention there is provided a new group of polyphosphonates which can be used as fire-retardant agents for polyurethane resins, and also a propitious method for preparing these compounds so as to obtain products characterized by acid numbers of below 10 mg. KOH/gram of sample.

What is claimed is:

1. A method for preparing compounds of the formula:

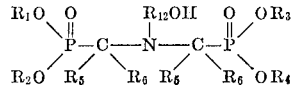

wherein $R_1$, $R_2$, $R_3$ and $R_4$ are independently selected from the group consisting of alkyl, chloroalkyl, bromoalkyl, hydroxyalkyl, alkoxyalkyl, hydroxyalkoxyalkyl, and aryl of phenyl and naphyhyl; and $R_5$ and $R_6$ are independently selected from the group consisting of hydrogen, alkyl, hydroxyalkyl, alkoxyalkyl, hydroxyalkoxyalkyl, and aryl of phenyl or naphthyl; said alkyl groups and said alkoxy groups having from 1 to 8 carbon atoms; and $R_{12}$ is an alkylene radical of from 2 to 10 carbon atoms; said method comprising:

(a) reacting a primary monoalkanol amine of the formula

wherein $R_{12}$ is as defined above, with at least 2 molar equivalents of a carbonyl compound of the formula

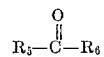

wherein $R_5$ and $R_6$ are as defined above, so as to provide a reaction mixture;

(b) incrementally adding the reaction mixture resulting from step (a) to a phosphonic acid diester of the formulae

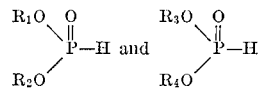

wherein $R_1$ and $R_2$ are as defined hereinbefore, and effecting a reaction there between at a temperature of less than about 110° C., said addition being conducted after adjusting the amount of free water present in said reaction mixture to less than 0.75 mole water per mole of phosphonic acid diester reactant used.

2. A method as recited in claim 1 wherein $R_5$ is hydrogen.

3. A method as recited in claim 1 wherein $R_{12}$ is ethylene.

4. A method as recited in claim 1 wherein $R_5$ and $R_6$ are hydrogen.

5. A method as recited in claim 1 wherein $R_1$, $R_2$, $R_3$ and $R_4$ are alkyl radicals.

6. A method as recited in claim 5 wherein said alkyl radicals are ethyl.

7. A method as recited in claim 1 wherein said carbonyl compound is paraformaldehyde.

8. A method as recited in claim 1 wherein said primary alkanol amine is ethanol amine.

9. A method as recited in claim 1 wherein said phosphonic acid ester is diethyl phosphonate.

10. A method as recited in claim 1 wherein said phosphonic acid ester is heated to a temperature of from about 50° C. to about 100° C. prior to the addition of said reaction mixture.

11. A method as recited in claim 1 wherein said primary alkanol amine is ethanol amine, said carbonyl compound is paraformaldehyde, said phosphonic acid diester is diethyl phosphonate.

12. A method as recited in claim 1 wherein said phosphonic acid diester is heated to a temperature of from about 50° C. to about 100° C. prior to the addition of said reaction mixture.

References Cited
UNITED STATES PATENTS 3,257,479  6/1966  Irani et al. _____ 260—932
3,076,010  1/1963  Beck et al. _____ 260—945

CHARLES B. PARKER, Primary Examiner
R. L. RAYMOND, Assistant Examiner

U.S. Cl. X.R.
252—8.1; 260—932